US012803956B2

(12) United States Patent
Leitão Libânio Gomes et al.

(10) Patent No.: US 12,803,956 B2
(45) Date of Patent: Nov. 17, 2026

(54) ENFORCING APPLICATION ACCESS POLICIES FOR A PRIVATE SELF-HOSTED APPLICATION AT A SECURE WEB GATEWAY

(71) Applicant: CLOUDFLARE, INC., San Francisco, CA (US)

(72) Inventors: Eduardo Joaquim Leitão Libânio Gomes, Hilversum (NL); Jesse Li, New York, NY (US); Kenneth A. Johnson, Austin, TX (US); Michael Borkenstein, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/988,715

(22) Filed: Dec. 19, 2024

(65) Prior Publication Data

US 2026/0180953 A1 Jun. 25, 2026

(51) Int. Cl.
*H04L 9/40* (2022.01)

(52) U.S. Cl.
CPC ........ *H04L 63/0236* (2013.01); *H04L 63/083* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 2018/0241721 | A1 | 8/2018 | Harvey | |
| 2019/0334869 | A1* | 10/2019 | Grant | H04L 63/0823 |
| 2021/0036991 | A1 | 2/2021 | Owens et al. | |
| 2024/0146692 | A1 | 5/2024 | Isola et al. | |
| 2024/0348664 | A1* | 10/2024 | Mohanram | H04L 63/20 |
| 2025/0103752 | A1* | 3/2025 | Vuppalapati | G06F 21/6254 |
| 2025/0202940 | A1* | 6/2025 | Bhat | H04L 63/0227 |
| 2025/0240277 | A1* | 7/2025 | Pathak | H04L 63/1458 |

OTHER PUBLICATIONS

International Search Report and Written Opinion, PCT App. No. PCT/US2025/060608, Mar. 9, 2026, 13 pages.

* cited by examiner

*Primary Examiner* — Trang T Doan
(74) *Attorney, Agent, or Firm* — NICHOLSON DE VOS WEBSTER & ELLIOTT LLP

(57) ABSTRACT

Enforcing application access policies for a private self-hosted application at a secure web gateway. Configuration is received for a private self-hosted application, for an access policy for accessing the private self-hosted application, and for an L7 policy that applies to L7 traffic that is scoped to the private self-hosted application. From the access policy, one or more rules to be evaluated by a secure web gateway are generated. An HTTP request is received at the secure web gateway that is destined for the private self-hosted application. The secure web gateway evaluates the HTTP request against the L7 policy. If the HTTP request is not to be blocked by the L7 policy, the secure web gateway evaluates the HTTP request against the generated rules. If the HTTP request is not to be blocked by the generated rules, the HTTP request is transmitted to the private self-hosted application.

21 Claims, 5 Drawing Sheets

ENFORCING APPLICATION ACCESS POLICIES FOR A PRIVATE SELF-HOSTED APPLICATION AT A SECURE WEB GATEWAY

FIELD

Embodiments of the invention relate to the field of network security; and more specifically, to enforcing application access policies for a private self-hosted application at a secure web gateway.

BACKGROUND

Cloud security service providers may offer multiple security services including a secure web gateway and an application access enforcer. A secure web gateway is conventionally designed to protect traffic from a client device through URL filtering, anti-malware detection and blocking, and application control. When a client device sends a request to a website or application on the internet, the request is analyzed at the secure web gateway. The secure web gateway inspects the request and allows it only if it does not violate policies, which are typically configured by the customer using the secure web gateway. An example policy is for URL filtering that controls which websites a user can load based on the URL (e.g., a blocklist of websites and/or categories that are not allowed). Another example policy is for scanning the traffic for malware. Another example policy works at the network level to inspect individual TCP/UDP/GRE packets (e.g., to block access to specific ports including non-HTTP resources). The policy may be scoped to a public application (e.g., a third-party application on the internet). A secure web gateway typically operates using a default-allow policy, blocking traffic only when explicitly denied.

An application access enforcer is conventionally designed to protect a private application of a customer (e.g., an internal application) from incoming traffic without the need of a VPN. Policies are defined that specify the conditions for accessing the application (e.g., the users that allowed access to the application and under what conditions). An application access enforcer typically operates with a default-deny approach, allowing access only when explicitly permitted.

A secure web gateway and an application access enforcer conventionally have separate policy engines and policy enforcement.

SUMMARY

In some aspects, the techniques described herein relate to a method in a cloud-based security service that includes a secure web gateway and an application access enforcer, the method including: receiving, at the application access enforcer, configuration from a customer of the cloud-based security service for a private self-hosted application, wherein the private self-hosted application is self-hosted at infrastructure of the customer, wherein the private self-hosted application is identified through a private hostname that is not part of a public domain name system (DNS) or through a private IP address that is not a publicly routable IP address; receiving configuration from the customer for a set of one or more access policies for accessing the private self-hosted application; generating, from the set of one or more access policies for accessing the private self-hosted application, one or more rules to be evaluated by the secure web gateway; receiving, at the secure web gateway, configuration from the customer for a set of one or more L7 policies that apply to L7 traffic, wherein at least one of the set of one or more L7 policies is scoped to the private self-hosted application; receiving first traffic at the secure web gateway from a first client device, the first traffic destined for the private self-hosted application; determining that the first traffic is first HTTPS traffic that is allowed to be inspected, the first HTTPS traffic including a first HTTP request; evaluating, at the secure web gateway, the first HTTP request against the set of one or more L7 policies; determining that the first HTTP request is not to be blocked as a result of the evaluating the first HTTP request against the set of one or more L7 policies; evaluating, at the secure web gateway, the first HTTP request against the one or more rules that are generated from the set of one or more access policies for accessing the private self-hosted application; determining that the first HTTP request is not to be blocked as a result of evaluating the first HTTP request against the one or more rules that are generated from the set of one or more access policies for accessing the private self-hosted application; and transmitting the first HTTP request to the private self-hosted application.

The method may further include: receiving, at the secure web gateway, configuration from the customer for a set of one or more network level policies; receiving second traffic at the secure web gateway from a second client device, the second traffic destined for the private self-hosted application; evaluating, at the secure web gateway, the second traffic against the set of one or more network level policies; determining that the second traffic is to be blocked as a result of evaluating the second traffic against the set of one or more network level policies; and dropping the second traffic.

The method may further include: receiving second traffic at the secure web gateway from a second client device, the second traffic destined for the private self-hosted application; determining that the second traffic is traffic that is not allowed to be inspected; evaluating, at the secure web gateway, the second traffic against the one or more rules that are generated from the set of one or more access policies for accessing the private self-hosted application; determining that the second traffic is to be blocked as a result of evaluating the second traffic against the one or more rules that are generated from the set of one or more access policies for accessing the private self-hosted application; and dropping the second traffic. Evaluating the second traffic against the one or more rules that are generated from the set of one or more access policies for accessing the private self-hosted application may include performing a session validation that includes: causing a client network application of the second client device to redirect to an identity provider login page; and responsive to a successful authentication via an identity provider, writing an application session token for the second client device to storage available to the secure web gateway. The second traffic may be non-HTTP traffic.

The set of one or more L7 policies may include one or more of: page level filtering; data loss prevention (DLP), and browser isolation control.

Evaluating the first HTTP against the set of one or more L7 policies may include: determining that a valid access token is not available from the first HTTP request; causing a client network application of the first client device to redirect to an identity provider login page; responsive to a successful authentication via an identity provider, generating an access token and setting the access token in a cookie; and sending the cookie to the client network application and redirecting the client to resubmit the first HTTP request with the cookie.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
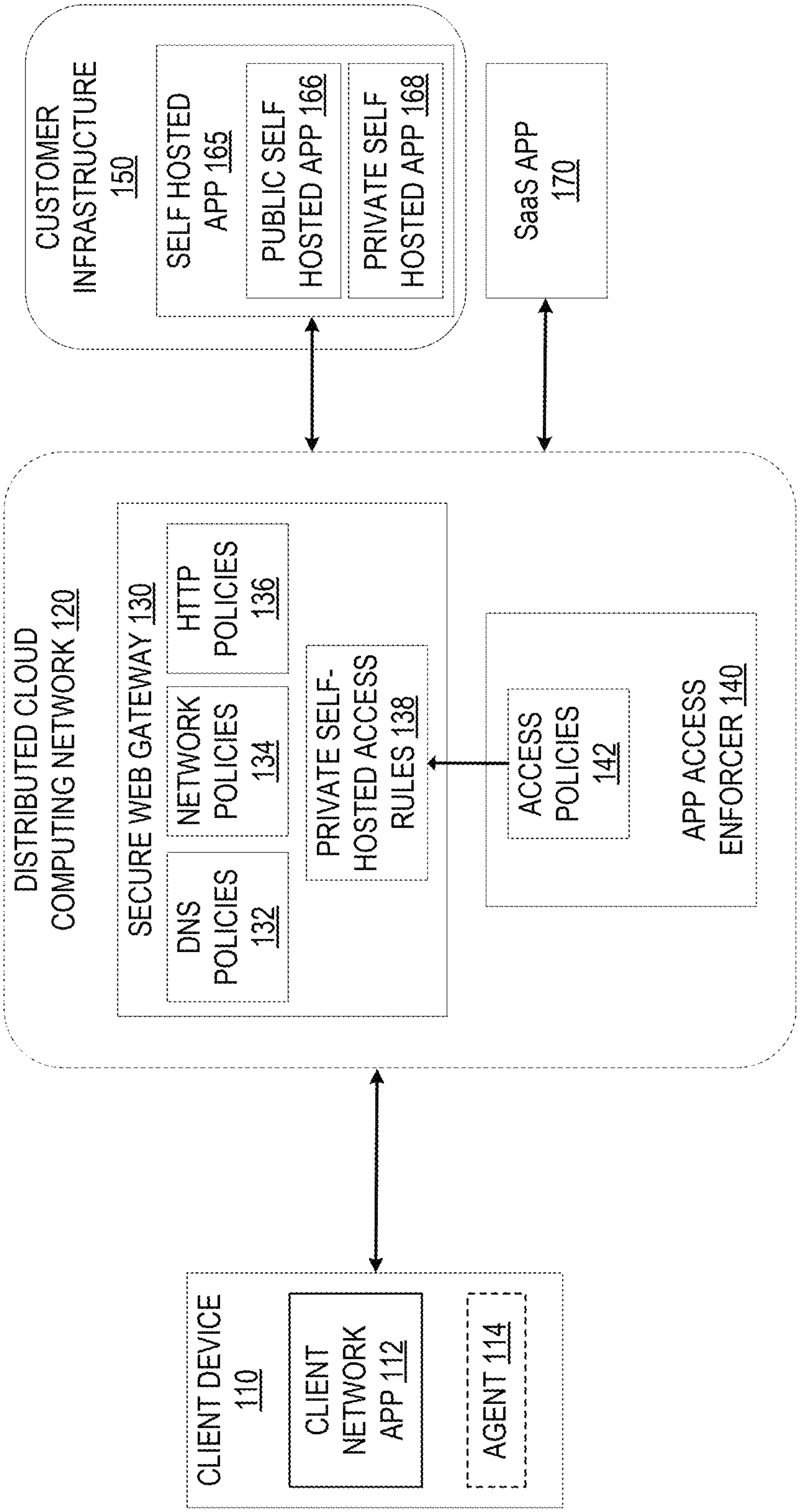
FIG. 1 illustrates an exemplary system for enforcing application access policies for a private self-hosted application at a secure web gateway according to an embodiment.

FIG. 1 illustrates an exemplary system for enforcing application access policies for a private self-hosted application at a secure web gateway according to an embodiment. The system includes a distributed cloud computing network 120 that provides multiple cloud-based security services including a secure web gateway 130 and an application access enforcer 140. The secure web gateway 130 and the application access enforcer 140 are executed on one or more servers (not shown in FIG. 1) that are part of the distributed cloud computing network 120. The distributed cloud computing network 120 can include multiple data centers that include multiple servers respectively. Each of these servers and/or data centers may execute an instance of the secure web gateway 130 and the application access enforcer 140.

The secure web gateway 130 evaluates and controls network traffic originating from endpoints within a private network, such as the client devices of an organization like the client device 110. The secure web gateway 130 can enforce DNS policies to inspect DNS queries (e.g., DNS filtering to block domains and/or IP addresses from resolving), network policies to inspect individual TCP, UDP, or GRE packets (e.g., to block access to specific ports including non-HTTP resources), HTTP policies to inspect HTTP requests (e.g., URL filtering to block specific URLs from loading), egress policies to inspect traffic to assign egress IP addresses that is unique to a customer, and/or resolver policies to inspect DNS queries to enable resolution by custom authoritative nameservers. As will be described in greater detail, the secure web gateway 130 enforces application access policies for a private self-hosted application.

The application access enforcer 140, which can be a zero trust network access service, enforces access control to application(s). The application access enforcer 140 allows customers to configure applications and enforce access policies to determine who can reach the configured applications.

Client devices, such as the client device 110, access resources protected or serviced by the distributed cloud computing network 120. The client device 110 is a computing device (e.g., laptop, desktop, smartphone, mobile phone, tablet, gaming system, set top box, internet-of-things (IoT) device, wearable device, or other network device) that can transmit and receive network traffic. The client device 110 executes a client network application 112 such as a web browser or other application that can access network resources. The client device 110 may also include an agent 114 that securely connects to the distributed cloud computing network 120. For instance, the agent 114 may establish a tunnel connection (e.g., a VPN connection) with a server that is executing the secure web gateway 130 and/or the application access enforcer 140, intercept all outgoing internet traffic or a defined subset of traffic, and transmit the traffic over the tunnel to the server. The tunnel connection may be a WireGuard point-to-point tunnel or another secure tunnel such as TLS, IPsec, or HTTP/2. The agent 114 may connect with the server regardless of the internet connection of the client device 110. For instance, the client device 110 may be on a public Wi-Fi network or other network not owned or controlled by the customer. The agent 114 may be configured to transmit identity information of the user of the client device (e.g., an email address, a unique device identifier, a unique identifier tied to the agent, an organization identifier to which the user belongs, etc.) to the distributed cloud computing network 120.

The secure web gateway 130 and the application access enforcer 140 may receive traffic in different ways. As an example, the client device 110 may include the agent 114 that intercepts outgoing internet traffic, or a defined subset of traffic, and transmits the traffic over a tunnel to the distributed cloud computing network 120. As another example, the client device 110 may transmit traffic to the distributed cloud computing network 120 due to a proxy auto-configuration (PAC) file that specifies that traffic is to be transmitted to the distributed cloud computing network 120. As another example, the client device 110 may transmit traffic to the distributed cloud computing network 120 due to the client device connecting to a proxy website that connects to a remote browser in the distributed cloud computing network 120. As another example, the client device 110 can transmit traffic to the distributed cloud computing network 120 due to selection of a link that resolves to a remote browser in the distributed cloud computing network 120. As another example, all traffic to and from the client device 110 may traverse a router that has a GRE tunnel or IPsec tunnel to the distributed cloud computing network 120. As another example, all traffic to and from the client device 110 may traverse a server or virtual machine that includes an agent that connects to the distributed cloud computing network 120.

The application access enforcer 140 allows customers to configure applications and policies for the configured applications. An example of an application is a self-hosted application 165 or a SaaS application 170. A self-hosted application 165 is an application that is hosted in the infrastructure of the customer (e.g., the customer infrastructure 150). A SaaS application 170 is a third-party application that is not hosted by the customer. Traffic for a self-hosted application 165 is proxied through the distributed cloud computing network 120. Traffic for a SaaS application 170 may be proxied through single sign on where the service provided by the distributed cloud computing network 120 acts as the Service Provider.

A self-hosted application 165 may be a public self-hosted application 166 or a private self-hosted application 168. A public self-hosted application 166 has a public hostname and/or a publicly routable IP address. A private self-hosted application 168 can be identified in different ways. For example, a private self-hosted application 168 can be identified through a private hostname (a hostname that is not part of the public DNS) and optionally a port or port range. As another example, a private self-hosted application 168 can be identified through, a private IP address (an IP address that is not publicly routable) and optionally a port or port range. As another example, a private self-hosted application 168 can be identified through a Classless Inter-Domain Routing (CIDR) block and optionally a port or port range. A self-hosted application 165 may connect to the distributed cloud computing network 120 in multiple ways. For instance, an agent may be installed on a server in the customer's network that creates a secure, outbound only, tunnel to the distributed cloud computing network 120. Traffic is only proxied to the self-hosted application 165 over the tunnel when initiated by a client to the self-hosted application 165. As another example, a VPN client may be installed on a server in the customer's network that establishes a connection with the distributed cloud computing network 120. As another example, a connector may be installed on a server in the customer's network that establishes connectivity to the distributed cloud computing network 120. This connector acts as a subnet router to relay client-initiated and server-initiated traffic between the devices. As another example, a GRE or IPSec tunnel may be established between a piece of network equipment in the customer infrastructure 150 and the distributed cloud computing network 120.

As part of configuring a self-hosted application 165, the customer can provide a name for the application, a session duration value that specifies how often a user's application token should expire (e.g., if the traffic is not associated with a valid token, the user will be prompted to reauthenticate with an identity provider), a hostname (which can be a public hostname or a private hostname), a port, and/or an IP address (which can be a publicly routable IP address or a private IP address or private CIDR range). The customer can configure one or more access policies for a configured application (e.g., a public self-hosted application 166, a private self-hosted application 168, and a SaaS application 170). The access policies 142 define criteria that a user and/or device must meet to access a self-hosted application 165 and/or a SaaS application 170. Each different application may have different access policies. It is also possible for an access policy to be defined once and applied to multiple applications. As an example, an access policy includes a rule selector that defines the criteria for users/devices to meet, rule types (e.g., include, exclude, require), an action to take (e.g., allow, block, bypass, service authentication), and value(s) for the access policy.

Example rule selectors include: emails (a specific email address); emails ending in; external evaluation (allows or denies access based on custom logic in an external API); IP ranges; country; everyone (allows, denies, or bypasses access to everyone); common name (the request will need to present a valid certificate with an expected common name); valid certificate (the request will need to present a valid client certificate); service token (the request will need to present the correct service token headers configured for the application); any access service token (the request will need to present the headers for any service token created for the customer); login methods (checks the identity provider used at the time of login); authentication method (checks the multifactor authentication method used by the user); identity provider group (checks the user groups configured with the identity provider); SAML group (checks a SAML attribute name/value pair); OIDC claim (checks an OIDC claim name/value pair); device posture (checks device posture signals); VPN configured (checks that the device is connected through a VPN).

In an embodiment, the self-hosted application 165 operates with a default-deny approach, where access is allowed only when explicitly permitted. An allow action allows a user to reach the application if the criteria is met (and all other criteria for accessing the application is met). A block action prevents a user from reaching the application. A bypass action disables any enforcement for traffic that meets the defined criteria, which can be used to enable applications that require specific endpoints to be public. A service authentication action enforces authentication flows that do not require an identity provider login, such as an API service. The rule selectors may include identity-based attributes and/or non-identity based attributes. An identity-based attribute is based on identity information associated with the request, such as an email address, emails ending in a specified domain, username, etc. A non-identity based attribute is not based on identity such as location (e.g., geographic region such as the country of origin), device posture, time of request, type of request, IP address, multifactor authentication status, multifactor authentication type, type of device, type of client network application, whether the request is associated with a VPN, an external evaluation rule, and/or other layer 3, layer 4, and/or layer 7 policies.

A customer of the service can create policies that are enforced by the secure web gateway 130. For example, a customer can create policies to inspect DNS queries and control the domains that resolve, inspect network traffic (e.g., layer 3 and layer 4) to control IP addresses and/or ports that can connect, and/or inspect application-level traffic (e.g., layer 7 traffic such as HTTP/S traffic). These policies can include identity, device posture, location, and/or risk signals. For example, an identity-based network policy may be used to control access to non-HTTP resources on a per-user (or per-identity). As shown in FIG. 1, the secure web gateway 130 can enforce DNS policies 132, network policies 134, and/or HTTP policies 136.

The DNS policies 132 allow for DNS filtering on DNS requests received from the client device 110. A DNS policy may specify the domains or category of domains that are allowed or not allowed. If a DNS request is received for a domain that is not allowed, the DNS query will not be allowed to resolve. If a DNS request is received for a domain that is allowed, the DNS query will be allowed to resolve and the answer may be returned to the client device 110. A DNS policy may be identity-based. An example DNS policy includes a traffic attribute that defines conditions to match traffic against (e.g., a rule selector such as application (e.g., a self-hosted application 165 (including a public self-hosted application 166 and a private self-hosted application 168) or a SaaS application 170), authoritative nameserver IP, content categories, DNS CNAME record, DNS MX record, DNS PTR record, DNS Resolver IP, DNS TXT record, DoH Subdomain, domain, and host), and rule operator for matching traffic to a selector (e.g., is, is not, in, not in, etc.), and value(s). The DNS policy includes an action (e.g., allow, block, override, safe search) to take upon a match. An allow action allows a matching DNS query to reach the destination. A block action blocks a matching DNS query from resolving. An override action for a matching DNS query to be responded with a domain to another destination. A safe search action for a matching DNS query enables safe search for search engines.

The network policies 134 allow for controlling network-level traffic (e.g., layer 3 and/or layer 4) leaving the client device 110. An example network policy includes an action (e.g., allow, block, audit SSH, network override), a rule selector that defines the criteria for matching traffic, a rule operator for matching traffic to a selector (e.g., is, is not, in, not in, etc.), and value(s). The rule selector may include an application (e.g., a self-hosted application 165 (including a public self-hosted application 166 and a private self-hosted application 168), a SaaS application 170); allow a specific private self-hosted application 168; allow all private self-hosted applications; a destination IP address; destination port; source IP address; source port; protocol; destination location; content categories; protocol; device posture; SNI hostname; SNI domain; source IP; source port; and/or identity-based selectors. The rule selectors related to allowing a private self-hosted application can be used to define precedence between a private self-hosted application and other policies enforced at the secure web gateway 130. Device posture may be used to require devices to have certain software installed or other configuration attributes. The identity-based selectors may include SAML attribute(s), user email, user group identifier, user group email, user group name, and user name. An allow action allows network traffic to reach the IP address and/or port. A block action blocks network traffic from reaching certain IP addresses or ports. An audit SSH action causes SSH traffic to be logged. A network override action causes traffic directed to, or coming from, certain IP addresses or ports, to be redirected to a specified IP address (either a public IP address or a private IP address).

The HTTP policies 136 allow for inspection of HTTPS requests and block or allow specific elements such as websites, IP addresses, and/or file types. The HTTP policies 136 operate up to layer 7. An example HTTP policy includes an action (e.g., allow, block, isolate, do not isolate, do not inspect, do not scan, quarantine), a rule selector that defines the criteria for matching traffic, a rule operator for matching traffic to a selector (e.g., is, is not, in, not in, etc.), and value(s). The rule selector may include specifying an application (e.g., a self-hosted application 165 (including a public self-hosted application 166 and a private self-hosted application 168), a SaaS application 170); allow a specific private self-hosted application 168; allow all private self-hosted applications; content categories; destination IP address; source IP address; device posture; domain; destination location; source location; download and/or upload file types; download and/or upload mime types; data loss prevention (DLP) profile; hostname; HTTP method; HTTP response; security risks; URL; URL path; URL path and query; URL query; and identity-based selectors. The URL, URL path, URL path and query, and URL query rule selectors can be used for page level filtering (e.g., allow only certain users access to certain pages).

The rule selectors related to allowing a private self-hosted application can be used to define precedence between a private self-hosted application and other policies enforced at the secure web gateway 130. The device posture selector can be used to require devices to have certain software installed or other configuration attributes. The DLP profile selector can be used to include a DLP policy to inspect the HTTP traffic for the presence of sensitive data such as social security numbers and/or credit card numbers. The identity-based selectors may include SAML attribute(s), user email, user group identifier, user group email, user group name, and user name. An allow action allows network traffic to reach the IP address and/or port. A block action blocks network traffic from reaching certain IP addresses or ports. An isolate action serves matched traffic to users via a remote browser isolation session. A do not isolate action turns off remote browser isolation for matched traffic. A do not inspect action bypasses certain elements from inspection (causing the secure web gateway 130 to refrain from decrypting and inspecting HTTPS traffic for matching elements).

The secure web gateway 130 and the application access enforcer 140 conventionally have separate policy engines and policy enforcement. The secure web gateway 130 is designed to evaluate and control network traffic originating from endpoints within a private network (e.g., the client devices of a corporate network). The application access enforcer 140 is designed to evaluate and control access for requests that traverse the internet to application(s). An application access enforcer typically operates with a default-deny approach, allowing access only when explicitly permitted (allow rules), whereas secure web gateways typically operate using a default-allow policy, blocking traffic only when explicitly denied (block rules). Traffic for a private self-hosted application 168 does not leave the internal network (other than the distributed cloud computing network 120) of the customer. However, because the application access enforcer 140 is designed to evaluate and control access for requests that traverse the internet, the application access enforcer 140 cannot evaluate and control network traffic for a private self-hosted application 168 because these requests do not traverse the internet.

Unlike conventional systems, in an embodiment an access policy for a private self-hosted application 168 can be defined at the application access enforcer 140 and then evaluated at the secure web gateway 130. An access policy for a private self-hosted application 168 is automatically mapped into fields for enforcement at the secure web gateway 130. For example, each rule selector of each access policy defined for the private self-hosted application 168 is mapped into a field that can be evaluated by the secure web gateway 130. For example, a rule selector in an access policy based on country is mapped to a country field at the secure web gateway 130. The action specified in the access policy is also mapped for enforcement at the secure web gateway 130. For example, an allow action in an access policy is mapped to an allow action at the secure web gateway 130 (pending verification of an application session token); a block action in an access policy is mapped to a block at the secure web gateway 130; a bypass action in an access policy is mapped to an allow action with no verification needed; and a service authentication action in an access policy is mapped to an allow action without verification of an application session token and a token is generated to present to the origin application (e.g., the private self-hosted application 168). Thus, a private self-hosted application 168 including an access policy is configured using the application access enforcer 140 and the secure web gateway 130 enforces the access policy. As illustrated in FIG. 1, an access policy (e.g., an access policy for a private self-hosted application 168) is mapped into the private self-hosted access rules 138 to be evaluated by the secure web gateway 130. A customer can also configure other policies that are scoped to the private self-hosted application that are enforced by the secure web gateway 130 (e.g., a DNS policy, a network policy, and/or an HTTP policy).

Traffic is received at the distributed cloud computing network 120 from client devices. For the purposes of this description, the traffic is associated with a customer of the cloud-based security services provided by the distributed cloud computing network 120. As an example, the traffic is received from a client device 110. As described earlier, the traffic from a client device can be received at the distributed cloud computing network 120 in different ways. However, in each case, the traffic is processed at a server of the distributed cloud computing network 120 in multiple phases including at the secure web gateway 130 and/or the application access enforcer 140.

Figure 2:
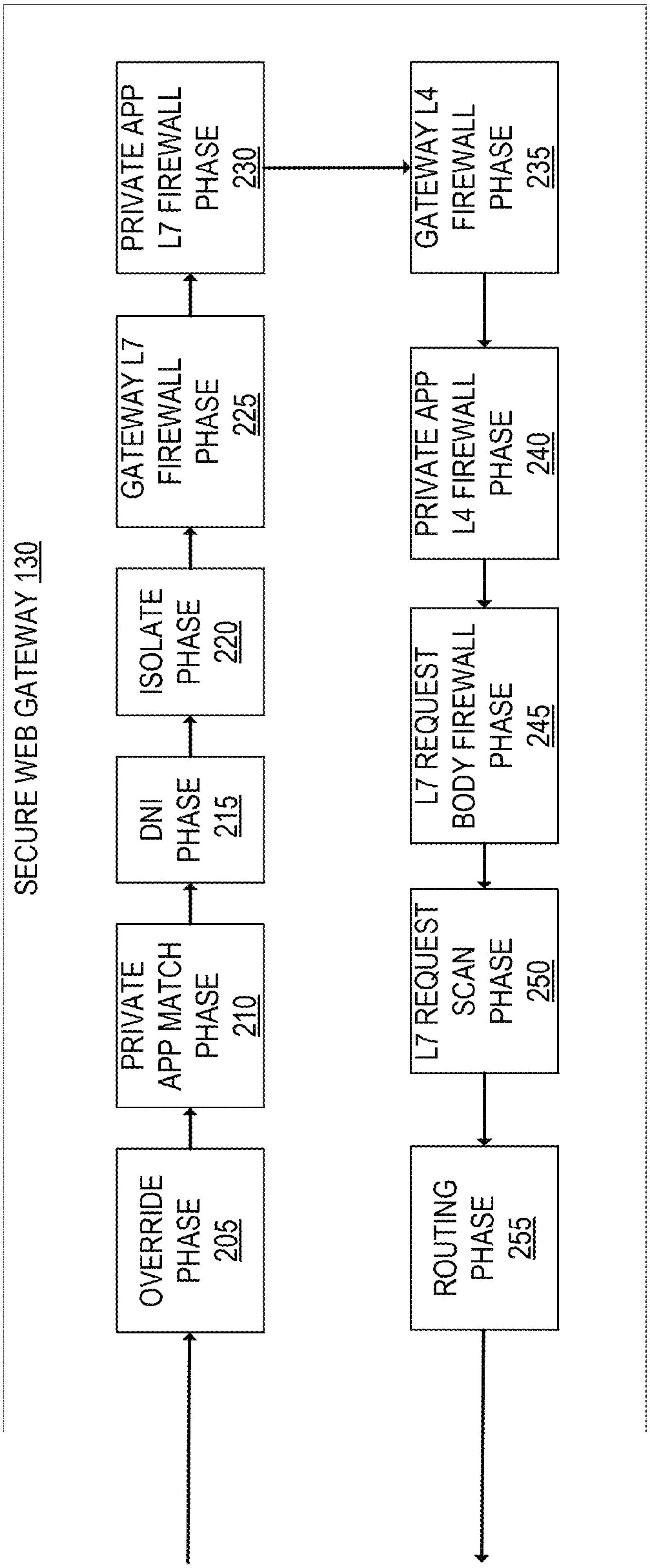
FIG. 2 illustrates an exemplary pipeline of phases that are performed at the secure web gateway according to an embodiment.

FIG. 2 illustrates an exemplary pipeline of phases that are performed at the secure web gateway 130 according to an embodiment. These phases include phases that evaluate policies that are defined at the secure web gateway 130 and phases that evaluate policies that are defined at the application access enforcer 140 (e.g., for a self-hosted private application).

The traffic is received at the secure web gateway 130 of a server of the distributed cloud computing network. For example, the traffic is received from the client device 110. The traffic may be HTTP traffic or non-HTTP traffic. The traffic may be encrypted (e.g., HTTPS). The secure web gateway 130 may be configured to use TLS inspection (or also known as TLS decryption or HTTPS inspection) to terminate TLS traffic (e.g., HTTPS traffic) for the customer, which may be based on all traffic or a proper subset of traffic.

After receiving the traffic, the secure web gateway 130 performs an override phase 205. The override phase evaluates the traffic against a network policy, if any, that includes a network override action. A network override action causes traffic directed to, or coming from, certain IP addresses or ports, to be redirected to a specified IP address (either a public IP address or a private IP address).

In a subsequent phase, the secure web gateway performs a private application match phase 210. In the private application match phase 210, the secure web gateway 130 determines whether the traffic matches a configured private self-hosted application 168 for the customer. If the private self-hosted application 168 is configured to be identified with a private hostname, the secure web gateway 130 can examine the SNI header, if available, and/or the host header to determine a hostname. The secure web gateway 130 determines whether that hostname matches with a configured private-self hosted application 168. If the private self-hosted application 168 is configured to be identified with a private IP address and optionally port, the secure web gateway 130 checks whether the destination IP address and optionally port match a configured private self-hosted application 168. If the traffic matches to a configured private self-hosted application 168, the secure web gateway 130 sets metadata that indicates that the traffic is for a private self-hosted application 168.

In a subsequent phase, the secure web gateway 130 performs a do not inspect (DNI) phase 215, which evaluates the traffic against any policy that includes a do not inspect action (if any). If the traffic matches such a policy, the secure web gateway 130 will not decrypt and inspect the traffic. If the traffic matches such a policy, the secure web gateway 130 sets metadata that indicates that the traffic is not to be decrypted and inspected. For example, a later phase that requires traffic inspection to execute (e.g., layer 7 phases) will not evaluate the traffic if the traffic is not to be decrypted and inspected. However, a later phase that does not require traffic inspection to execute (e.g., layer 4 phases) may evaluate the traffic.

In a subsequent phase, the secure web gateway 130 performs an isolate phase 220, which evaluates the traffic against any policy that includes an isolate action (if any). If the traffic matches such a policy, the secure web gateway 130 sets metadata that indicates that the traffic is to be isolated using browser isolation. If traffic is to be isolated using browser isolation and the result of the phases is to allow the traffic, it will be rendered in an isolated browser (e.g., a remote browser instance). If traffic is to be isolated using browser isolation and the result of the phases is to block the traffic, a block page may be presented using an isolated browser. The customer may configure a browser isolation policy that defines browser isolation control such as disabling copy/paste, disable printing, disable keyboard, disable upload, disable download, and/or disable clipboard redirection.

In a subsequent phase, the secure web gateway 130 performs the gateway L7 firewall phase 225. In this phase, the secure web gateway 130 evaluates the received traffic up to layer 7 against the policy(ies), if any, configured by the customer through the secure web gateway 130. Such a policy can be one of the HTTP policies 136. These policies are referred to as L7 policies even though such a policy could be evaluated at a layer lower than L7 depending on the policy (e.g., a policy that allows/blocks certain IP addresses). There can be multiple L7 policies that are associated with the customer that are evaluated by the secure web gateway 130. Such an L7 policy can be scoped to a private self-hosted application. The secure web gateway 130 does not evaluate the traffic in this phase if the traffic is not L7 traffic (e.g., is not HTTP traffic) or if the traffic is associated with metadata that indicates that the traffic is not to be decrypted and inspected.

If a policy includes an identity-based selector, an identity of the user may need to be determined. In an embodiment, the secure web gateway 130 performs a session validation to verify and authenticate the session of the client to ensure that the session is valid. The secure web gateway 130 can attempt to retrieve an access cookie from the traffic (e.g., a JSON Web Token included in a header of the request). If the access cookie is valid, not expired, and not revoked, the session validation is successful. If there is no access cookie, or the cookie is invalid, expired, or revoked, an authentication is triggered. The authentication can include redirecting the client to an identity provider login page, which may have been configured by the customer. If the user successfully authenticates via the identity provider, an access cookie is sent to the client and the client is redirected to resubmit the request with the access cookie. If the user does not successfully authenticate via the identity provider, the request will not be allowed.

If there are no L7 policies that match the traffic, the secure web gateway 130 treats the traffic as having an implicit allow and processing will continue in further phases. If there is only one L7 policy that matches the traffic and has an Allow action, the result of this phase is an allow decision and processing will continue in further phases. If there is only one L7 policy that matches the traffic and has a Block action, the result of this phase is a block decision and the secure web gateway 130 will block the traffic.

There can be multiple L7 policies that match the traffic. In an embodiment, a policy precedence system is used such that policies are evaluated in order of precedence, which can be configured by the customer, and a first matching policy that has an Allow or Block action will control and the evaluation stops and no subsequent L7 policies can override the decision at the gateway L7 firewall phase 225. For example, if there are two policies that would both match where the first policy according to precedence has an Allow action and the second policy has a Block action, the action of the first matching policy controls, meaning that the result of the gateway L7 firewall phase 225 will be an allow decision. In another embodiment, there is no policy precedence and to allow the traffic, the traffic must not match any Block action. Using the same example of two policies that both match where one policy has an Allow action and another policy has a Block action, in this embodiment, the secure web gateway 130 will block the traffic because there was a policy that matched a Block action.

If there is an allow decision from the gateway L7 firewall phase 225, it is possible that the traffic could be blocked by a subsequent phase so the traffic will continue to be processed. However, if there is a block decision from the gateway L7 firewall phase 225, the secure web gateway 130 will block the traffic. Thus, a block decision at the gateway L7 firewall phase 225 is a terminal decision and an allow decision at the gateway L7 firewall phase 225 is a non-terminal decision.

Assuming that the traffic is not blocked as a result of the gateway L7 firewall phase 225, the secure web gateway 130 performs the private application L7 firewall phase 230. In this phase, the secure web gateway 130 evaluates the traffic against the one or more policies that have been configured in the application access enforcer 140 for the private self-hosted application, which can include evaluating the traffic up to layer 7. The private application L7 firewall phase 230 is performed only if the traffic matches to a private self-hosted application of the customer. For example, the secure web gateway 130 determines whether the traffic is associated with metadata that indicates that the traffic is for a private self-hosted application as determined in the private application match phase 210. The secure web gateway 130 does not evaluate the traffic in this phase if the traffic is not L7 traffic (e.g., is not HTTP traffic) or if the traffic is associated with metadata that indicates that the traffic is not to be decrypted and inspected.

To enforce these policies for a private self-hosted application 168 that is configured in the application access enforcer 140, the secure web gateway 130 loads or accesses configuration for the private self-hosted application 168 and evaluates the traffic against the rules defined in the access policy for the private self-hosted application 168. The configuration for the private self-hosted application 168 may include one or more configuration fields that are specific to the private self-hosted application 168 (e.g., the hostname, an application identifier, a session duration); one or more configuration fields that are specific to the customer that configured the application (e.g., an account ID, the authentication domain, whether custom block pages are used); account access key(s) (e.g., a key for signing tokens for requests with non-identity, a key for decrypting a VPN session); account service tokens (e.g., all service tokens for the account); and session revocations (e.g., all the revocations for an account).

The secure web gateway 130 determines the values for the fields it will match against when evaluating the ruleset. For example, if the access policy has a service token rule selector, the secure web gateway 130 determines the service token provider in the HTTP request (if any), which is then used to match against the expression when evaluating the ruleset. The secure web gateway 130 will load the service token(s) for the customer and a check will be made whether the request has a valid client ID and secret. If it does, then the token ID is set in context for later re-evaluation in a subsequent phase. As another example, if the access policy has a device posture rule selector, the secure web gateway 130 may determine the device posture of the device making the request.

The secure web gateway 130 evaluates the traffic against the rules that have been automatically generated from the access policy for the private self-hosted application. If a ruleset is generated from an identity-based selector, the identity of the user may need to be determined. In an embodiment, the secure web gateway 130 performs a session validation to verify and authenticate the session of the client to ensure that the session is valid. Session validation includes verifying and authenticating the session of the client. This ensures that the session is valid for the traffic. The secure web gateway 130 attempts to retrieve an access cookie from the traffic (e.g., a JSON Web Token included in a header of the request). If the access cookie is valid, not expired, and not revoked, the session validation is successful. If there is no access cookie, or the cookie is invalid, expired, or revoked, an authentication is triggered. The authentication can include redirecting the client to an identity provider login page, which may have been configured by the customer. If the user successfully authenticates via the identity provider, an access cookie is sent to the client and the client is redirected to resubmit the request with the access cookie. If the user does not successfully authenticate via the identity provider, the request will not be allowed.

If the traffic does not match any ruleset, then the traffic is blocked. If there is only one ruleset that matches the traffic and has an Allow action, the result of this phase will be an allow decision. If there is only one ruleset that matches the traffic and has a Block action, the result of this phase will be a block decision and the secure web gateway 130 will block the traffic. If there is only one ruleset that matches the traffic and has a non-identity action (e.g., a service authentication action), then the traffic will have an allow decision in this phase and an authorization token is generated and attached as a cookie header to be provided to the origin application (e.g., the private self-hosted application 168). If there is only one ruleset that matches with a bypass action, then the traffic will have an allow decision from the private application L7 firewall phase 230.

There can be multiple rulesets from multiple private self-hosted application policies that match the traffic during the private application L7 firewall phase 230. In an embodiment, a policy precedence system is used such that policies are evaluated in order of precedence, which can be configured by the customer, and a first matching policy that has an Allow or Block action will control and the evaluation stops and no subsequent policies can override the decision at the private application L7 firewall phase 230. For example, if there are two policies that would both match where the first policy according to precedence has an Allow action and the second policy has a Block action, the action of the first matching policy controls, meaning that the result of the private application L7 firewall phase 230 will be an allow decision. In another embodiment, there is no policy precedence and to allow the traffic, the traffic must not match any Block action. Using the same example of two policies that both match where one policy has an Allow action and another policy has a Block action, in this embodiment, the secure web gateway 130 will block the traffic because there was a policy that matched a Block action.

If there is an allow decision from the private application L7 firewall phase 230, it is possible that the traffic could be blocked by a subsequent phase so the traffic will continue to be processed. However, if there is a block decision from the private application L7 firewall phase 230, the secure web gateway 130 will block the traffic. Thus, a block decision at the private application L7 firewall phase 230 is a terminal decision and an allow decision at the private application L7 firewall phase 230 is a non-terminal decision.

Assuming that the traffic is not blocked at the private application L7 firewall phase 230, the secure web gateway 130 performs the L4 gateway firewall phase 235. In this phase, the secure web gateway 130 evaluates the received traffic against an L4 policy, if any, that is defined for the customer through the secure web gateway 130. An L4 policy can be one of the network policies 134. The L4 policy operates at layer 3 and/or layer 4. Such an L4 policy can be applied to the private self-hosted application. The L4 gateway firewall phase 235 operates at a layer that does not require the traffic to be decrypted and inspected. For example, the L4 gateway firewall phase 235 can evaluate HTTPS traffic that cannot be decrypted at the distributed cloud computing network 120 or traffic that is associated with metadata that indicates that the traffic is not to be decrypted and inspected. In some embodiments, traffic that has an allow decision through the L7 phases previously described will also be evaluated at the L4 gateway firewall phase 235.

There can be zero or multiple L4 gateway firewall policies that match the traffic. If there are no L4 gateway policies that match the traffic, the secure web gateway 130 treats the traffic as having an implicit allow decision. In an embodiment, a policy precedence system is used such that multiple policies are evaluated in order of precedence, which can be configured by the customer, and a first matching policy that has an Allow or Block action will control and the evaluation stops and no subsequent L4 policies can override the decision at the L4 gateway firewall phase 235. For example, if there are two policies that would both match where the first policy according to precedence has an Allow action and the second policy has a Block action, the action of the first matching policy controls, meaning that the result of the L4 gateway firewall phase 235 will be an allow decision. In another embodiment, there is no policy precedence and to allow the traffic, the traffic must not match any Block action. Using the same example of two policies that both match where one policy has an Allow action and another policy has a Block action, in this embodiment, the secure web gateway 130 will block the traffic because there was a policy that matched a Block action.

If there is an allow decision from the L4 gateway firewall phase 235, it is possible that the traffic could be blocked by a subsequent phase so the traffic will continue to be processed. However, if there is a block decision from the L4 gateway firewall phase 235, the secure web gateway 130 will block the traffic. Thus, a block decision at the L4 gateway firewall phase 235 is a terminal decision and an allow decision at the L4 gateway firewall phase 235 is a non-terminal decision.

If the traffic is not blocked at the L4 gateway firewall phase 235, the secure web gateway 130 performs the private application L4 firewall phase 240. The private application L4 firewall phase 240 is performed only if the traffic matches to a private self-hosted application of the customer and was not evaluated at the private application L7 firewall phase 230. Thus, if the traffic was evaluated at the private application L7 firewall phase 230, the traffic is not evaluated at the private application L4 firewall phase 240 phase. The secure web gateway 130 can determine whether the traffic is associated with metadata that indicates that the traffic is for a private self-hosted application as determined in the private application match phase 210. The L4 gateway firewall phase 235 ensures that traffic that is not inspected (e.g., non-HTTP traffic, HTTPS traffic that has not been terminated at the distributed cloud computing network 120, or traffic that is associated with metadata that indicates that the traffic is not to be decrypted and inspected (e.g., as determined in the do not inspect phase 215)) is evaluated against the policy(ies) defined for the private self-hosted application.

In this phase, the secure web gateway 130 evaluates the received traffic against the one or more policies that have been configured in the application access enforcer 140 for the private self-hosted application, which can include evaluating the traffic up to layer 4. To enforce these policies for a private self-hosted application that are configured in the application access enforcer 140, the secure web gateway 130 loads or accesses configuration for the private self-hosted application and evaluates the traffic against the rules defined in the access policy for the private self-hosted application. This configuration may be loaded from earlier phases (e.g., the private application L7 firewall phase 230). The secure web gateway 130 determines the values for the fields it will match against when evaluating the ruleset, like as previously described.

The secure web gateway 130 evaluates the traffic against the rules that have been automatically generated from the access policy for the private self-hosted application. If a policy has an identity-based selector, an identity of the user may need to be determined. In an embodiment, the secure web gateway 130 performs a session validation to verify and authenticate the session of the client to ensure that the session is valid. Session validation for the private application L4 firewall phase 240 is different from the session validation for the private application L7 firewall phase 230. Unlike the session validation for the private application L7 firewall phase 230, which can check for an access cookie in the traffic, cookies are not available in the private application L4 firewall phase 240. As part of validating the session, the secure web gateway 130 attempts to read an application session token for the client device. If the application session token is valid, not expired, and not revoked, the session validation is successful. If a valid application session token is not found, the secure web gateway 130 notifies the client device that the user needs to be authenticated. This notification is through a data channel to a software agent that executes on the client device (if such a software agent is not executing, the traffic will be blocked). This notification causes the client device to open a browser window to login with a metadata application session token created by the secure web gateway 130. This application session token is similar to the application session token returned in the session validation for the private application L7 firewall phase, but it also includes a device identifier to associate the authenticating client device with the created application session token. The client network application 112 is then redirected to an identity provider login page, which may have been configured by the customer. If the user successfully authenticates via the identity provider, the application session token is written to storage available to the server. The secure web gateway 130 will periodically request the application session token data from the storage until it is available. Until a valid application session token is available, the traffic will not egress from the secure web gateway 130. Once the valid application session token is available, then processing can continue with the valid session determination.

If the traffic does not match any ruleset, then the traffic is blocked. If there is only one ruleset that matches the traffic and has an Allow action, the result of this phase will be an allow decision. If there is only one ruleset that matches the traffic and has a Block action, the result of this phase will be a block decision and the secure web gateway 130 will block the traffic. If there is only one ruleset that matches the traffic and has a non-identity action (e.g., a service authentication action), the secure web gateway 130 blocks the traffic (an assertion token should not be associated with traffic that cannot be inspected). If there is only one ruleset that matches with a bypass action, then the traffic will have an allow decision from the private application L4 firewall phase 240.

There can be multiple rulesets from multiple private self-hosted application policies that match the traffic during the private application L4 firewall phase 240. In an embodiment, a policy precedence system is used such that policies are evaluated in order of precedence, which can be configured by the customer, and a first matching policy that has an Allow or Block action will control and the evaluation stops and no subsequent policies can override the decision at the private application L4 firewall phase 240. For example, if there are two policies that would both match where the first policy according to precedence has an Allow action and the second policy has a Block action, the action of the first matching policy controls, meaning that the result of the private application L4 firewall phase 240 will be an allow decision. In another embodiment, there is no policy precedence and to allow the traffic, the traffic must not match any Block action. Using the same example of two policies that both match where one policy has an Allow action and another policy has a Block action, in this embodiment, the secure web gateway 130 will block the traffic because there was a policy that matched a Block action.

If there is a block decision from the private application L4 firewall phase 240, the secure web gateway 130 will block the traffic. Thus, a block decision at private application L4 firewall phase 240 is a terminal decision.

If the traffic is not blocked at the private application L4 firewall phase 240, the secure web gateway 130 performs the L7 request body firewall phase 245. The secure web gateway 130 does not evaluate the traffic in this phase if the traffic is not L7 traffic (e.g., is not HTTP traffic) or if the traffic is associated with metadata that indicates that the traffic is not to be decrypted and inspected. In this phase, the secure web gateway 130 evaluates the body of the request against rules related to uploading or data loss prevention (DLP) rules that are configured by the customer. For instance, the customer can configure a policy to block a request that has specified content (e.g., social security numbers, insurance numbers, tax numbers, or other identification numbers within its body; financial information) in the body. If the result of the L7 request body firewall phase 245 is a block action, the secure web gateway 130 blocks the request.

If the traffic is not blocked at the L7 request body firewall phase 245, the secure web gateway 130 performs the L7 request scan phase 250. The secure web gateway 130 does not evaluate the traffic in this phase if the traffic is not L7 traffic (e.g., is not HTTP traffic) or if the traffic is associated with metadata that indicates that the traffic is not to be decrypted and inspected. In this phase, the secure web gateway 130 evaluates the request to determine whether the request itself or a file included in the request contains malicious code. The customer can configure a policy to block a request that has been detected as including malicious code. If the result of the L7 request scan phase 250 is a block action, the secure web gateway 130 blocks the request.

If the traffic is not blocked at the L7 request scan phase 250, the secure web gateway 130 performs the routing phase 255. In the routing phase 255, the traffic is sent upstream towards its destination. For example, in the case of a private self-hosted application 168, the routing phase 255 connects to the customer infrastructure 150 as configured by the customer. For example, if the private self-hosted application 168 is connected with a tunnel to the distributed cloud computing network 120, the routing phase 255 transmits the traffic towards the tunnel for delivery to the private self-hosted application 168.

Not all the phases described in FIG. 2 are required to be performed in every embodiment. For example, the override phase 205, the DNI phase 215, the isolate phase 220, the L7 request body firewall phase 245, and/or the L7 request scan phase 250 can be optional in some embodiments. Further, the order of the phases may be different in some embodiments. Also, one or more of the phases may be combined.

Figure 3:
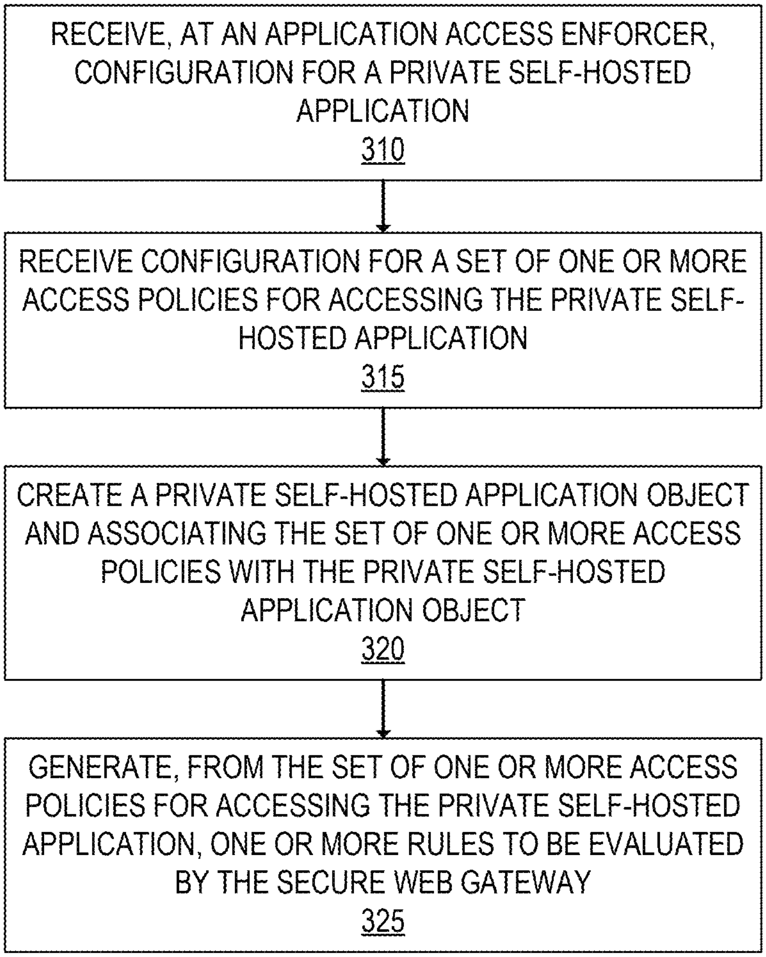
FIG. 3 is a flow diagram that illustrates exemplary operations for configuring a private self-hosted application according to an embodiment.

FIG. 3 is a flow diagram that illustrates exemplary operations for configuring a private self-hosted application according to an embodiment. The operations of FIG. 3 are described with respect to the exemplary embodiment of FIG. 1. However, the exemplary embodiment of FIG. 1 can perform operations different from that of FIG. 3, and the operations of FIG. 3 can be performed by different embodiments from that of FIG. 1.

At operation 310, the application access enforcer 140 receives configuration from a customer for a private self-hosted application 168. The private self-hosted application 168 is self-hosted at the customer infrastructure 150 and connected to the distributed cloud computing network 120 as previously described. The configuration includes specifying how the private self-hosted application 168 is identified. The private self-hosted application 168 may be identified in different ways. For example, the private self-hosted application 168 may be identified through a private hostname that is not part of the public DNS and optionally a port or port range. As another example, the private self-hosted application 168 may be identified through a private IP address that is not a publicly routable IP address and optionally a port or port range. As another example, the private self-hosted application 168 may be identified through a CIDR block and optionally a port or port range. The application access enforcer 140 may also receive a name for the private self-hosted application 168 and/or a session duration value that specifies how often a user's application token should expire (e.g., if the traffic is not associated with a valid token, the user will be prompted to reauthenticate with an identity provider).

Next, at operation 315, the application access enforcer 140 receives configuration for a set of one or more access policies 142 for accessing the private self-hosted application 168. An example access policy includes a rule selector that defines the criteria for users/devices to meet, rule types (e.g., include, exclude, require), an action to take (e.g., allow, block, bypass, service authentication), and value(s) for the access policy. Example rule selectors include: emails (a specific email address); emails ending in; external evaluation (allows or denies access based on custom logic in an external API); IP ranges; country; everyone (allows, denies, or bypasses access to everyone); common name (the request will need to present a valid certificate with an expected common name); valid certificate (the request will need to present a valid client certificate); service token (the request will need to present the correct service token headers configured for the application); any access service token (the request will need to present the headers for any service token created for the customer); login methods (checks the identity provider used at the time of login); authentication method (checks the multifactor authentication method used by the user); identity provider group (checks the user groups configured with the identity provider); SAML group (checks a SAML attribute name/value pair); OIDC claim (checks an OIDC claim name/value pair); device posture (checks device posture signals); VPN configured (checks that the device is connected through a VPN).

Next, at operation 320, the application access enforcer 140 creates a private self-hosted application object and associates the set of one or more access policies with the private self-hosted application object. The private self-hosted application object can be used in a policy created in the secure web gateway 130 to scope the policy to the private self-hosted application 168.

Next, at operation 325, one or more rules to be evaluated by the secure web gateway 130 are generated from the set of one or more access policies for accessing the private self-hosted application 168. For example, each rule selector of each access policy defined for the private self-hosted application 168 is mapped into a field that can be evaluated by the secure web gateway 130. The action specified in each access policy is also mapped for enforcement at the secure web gateway 130. For example, an allow action in an access policy is mapped to an allow action at the secure web gateway 130 (pending verification of an application session token); a block action in an access policy is mapped to a block at the secure web gateway 130; a bypass action in an access policy is mapped to an allow action with no verification needed; and a service authentication action in an access policy is mapped to an allow action without verification of an application session token and a token is generated to present to the origin application (e.g., the private self-hosted application 168).

Figure 4:
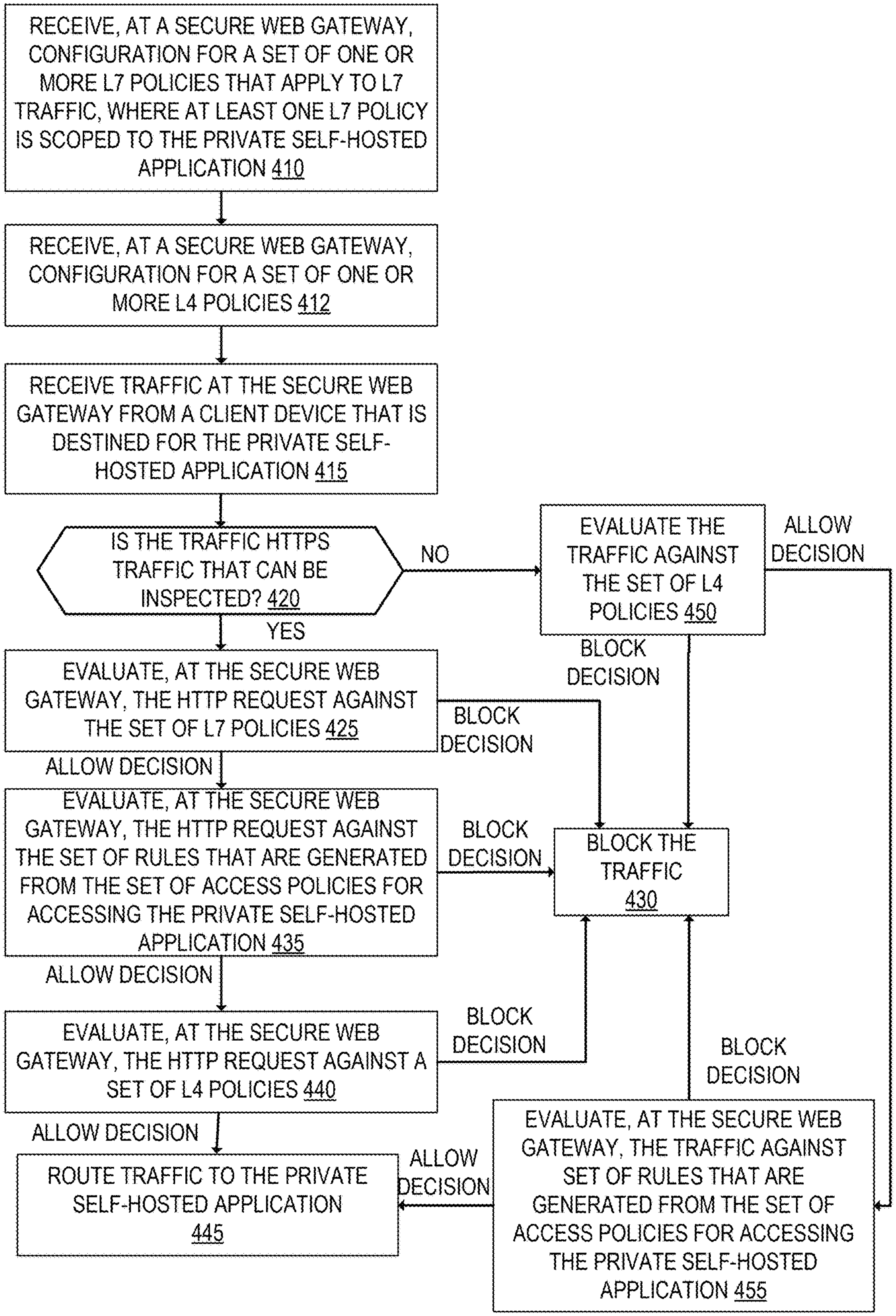
FIG. 4 is a flow diagram that illustrates exemplary operations for enforcing policies at a secure web gateway according to an embodiment.

FIG. 4 is a flow diagram that illustrates exemplary operations for enforcing policies at a secure web gateway according to an embodiment. The operations of FIG. 4 are described with respect to the exemplary embodiment of FIG. 1. However, the exemplary embodiment of FIG. 1 can perform operations different from that of FIG. 4, and the operations of FIG. 4 can be performed by different embodiments from that of FIG. 1.

At operation 410, the secure web gateway 130 receives configuration from a customer that defines a set of one or more L7 policies that apply to L7 traffic (e.g., HTTP traffic). At least one of these L7 policies is scoped to the private self-hosted application. An example L7 policy is an HTTP policy that includes an action (e.g., allow, block), a rule selector that defines the criteria for matching traffic, a rule operator for matching traffic to a selector (e.g., is, is not, in, not in, etc.), and value(s). The rule selector may include specifying a private self-hosted application 168 configured by the customer; allow a specific private self-hosted application 168; allow all private self-hosted applications; content categories; destination IP address; source IP address; device posture; domain; destination location; source location; download and/or upload file types; download and/or upload mime types; data loss prevention (DLP) profile; hostname; HTTP method; HTTP response; security risks; URL; URL path; URL path and query; URL query; and identity-based selectors. The rule selectors related to allowing a private self-hosted application can be used to define precedence between a private self-hosted application and other policies enforced at the secure web gateway 130. The device posture selector can be used to require devices to have certain software installed or other configuration attributes. The DLP profile selector can be used to include a DLP policy to inspect the HTTP traffic for the presence of sensitive data such as social security numbers and/or credit card numbers. The identity-based selectors may include SAML attribute(s), user email, user group identifier, user group email, user group name, and user name. An allow action allows network traffic to reach the IP address and/or port. A block action blocks network traffic from reaching certain IP addresses or ports.

At operation 412, the secure web gateway 130 receives configuration from the customer that defines a set of one or more L4 policies that apply to L3 and/or L4 traffic (e.g., at the network layer). One or more of these policy(ies) may be scoped to the private self-hosted application 168. Traffic that is not layer 7 or cannot be inspected can be evaluated against the one or more L4 polices. An example L4 policy is a network policy that includes an action (e.g., allow, block, audit SSH, network override), a rule selector that defines the criteria for matching traffic, a rule operator for matching traffic to a selector (e.g., is, is not, in, not in, etc.), and value(s). The rule selector may include an application (e.g., a self-hosted application 165 (including a public self-hosted application 166 and a private self-hosted application 168), a SaaS application 170); allow a specific private self-hosted application 168; allow all private self-hosted applications; a destination IP address; destination port; source IP address; source port; protocol; destination location; content categories; protocol; device posture; SNI hostname; SNI domain; source IP; source port; and/or identity-based selectors. The rule selectors related to allowing a private self-hosted application can be used to define precedence between a private self-hosted application and other policies enforced at the secure web gateway 130. Device posture may be used to require devices to have certain software installed or other configuration attributes. The identity-based selectors may include SAML attribute(s), user email, user group identifier, user group email, user group name, and user name.

The operations 410 and 412 can be performed in a different order. The operations 410 and/or 412 are optional in some embodiments.

Next, at operation 415, the secure web gateway receives traffic at the secure web gateway 130 from a client device 110 that is destined for the private self-hosted application 168. The traffic can be received at the secure web gateway 130 in different ways. For example, the client device 110 may include an agent 114 that intercepts outgoing internet traffic, or a defined subset of traffic, and transmits the traffic over a tunnel to the distributed cloud computing network 120 that is then received at the secure web gateway 130. As another example, the client device 110 may transmit traffic to the distributed cloud computing network 120 due to a proxy auto-configuration (PAC) file that specifies that traffic is to be transmitted to the distributed cloud computing network 120 that is then received at the secure web gateway 130. As another example, the client device 110 may transmit traffic to the distributed cloud computing network 120 due to the client device connecting to a proxy website that connects to a remote browser in the distributed cloud computing network 120 that is then received at the secure web gateway 130. As another example, all traffic to and from the client device 110 may traverse a router that has a GRE tunnel or IPsec tunnel to the distributed cloud computing network 120 that is then received at the secure web gateway 130. As another example, the client device 110 can transmit traffic to the distributed cloud computing network 120 due to selection of a link that resolves to a remote browser in the distributed cloud computing network 120. As another example, all traffic to and from the client device 110 may traverse a server or virtual machine that includes an agent that connects to the distributed cloud computing network 120 that is then received at the secure web gateway 130.

Next, at operation 420, the secure web gateway 130 determines whether the traffic is HTTPS traffic that can be inspected. For example, the secure web gateway 130 can determine whether the traffic matches a policy that includes a do not inspect action to determine whether traffic is allowed to be inspected. If the traffic is HTTPS traffic that can be inspected, then operation 425 is performed; otherwise operation 450 is performed.

At operation 425, the secure web gateway 130 evaluates the HTTP request against the set of L7 policies configured at the secure web gateway 130 (e.g., in operation 410). There can be multiple L7 policies that match the traffic. In an embodiment, a policy precedence system is used such that policies are evaluated in order of precedence, which can be configured by the customer, and a first matching policy that has an Allow or Block action will control and the evaluation stops for these policies. In another embodiment, there is no policy precedence and to allow the traffic, the traffic must not match any Block action. If there is no L7 policy that matches the HTTP request, the secure web gateway 130 treats this as an Allow decision. If the result of this evaluation is a Block decision, then operation 430 is performed where the secure web gateway 130 blocks the traffic. If the result of this evaluation is an Allow decision, then operation 435 is performed.

At operation 435, the secure web gateway 130 evaluates the HTTP request against the set of one or more rules that are generated from the set of one or more access policies for accessing the private self-hosted application 168. The secure web gateway 130 loads or accesses configuration for the private self-hosted application 168, which may include one or more configuration fields that are specific to the private self-hosted application 168 (e.g., the hostname, an application identifier, a session duration); one or more configuration fields that are specific to the customer that configured the application (e.g., an account ID, the authentication domain, whether custom block pages are used); account access key(s) (e.g., a key for signing tokens for requests with non-identity, a key for decrypting a VPN session); account service tokens (e.g., all service tokens for the account); and session revocations (e.g., all the revocations for an account). The secure web gateway 130 determines the values for the fields it will match against when evaluating the ruleset. For example, if the access policy has a service token rule selector, the secure web gateway 130 determines the service token provider in the HTTP request (if any), which is then used to match against the expression when evaluating the ruleset. The secure web gateway 130 will load the service token(s) for the customer and a check will be made whether the request has a valid client ID and secret. If it does, then the token ID is set in context for later re-evaluation in a subsequent phase. As another example, if the access policy has a device posture rule selector, the secure web gateway 130 may determine the device posture of the device making the request. If the access policy has an identity-based selector, the identity of the user may need to be determined. In an embodiment, the secure web gateway 130 performs a session validation to verify and authenticate the session of the client to ensure that the session is valid. Session validation includes verifying and authenticating the session of the client. This ensures that the session is valid for the traffic. The secure web gateway 130 attempts to retrieve an access cookie from the traffic (e.g., a JSON Web Token included in a header of the request). If the access cookie is valid, not expired, and not revoked, the session validation is successful. If there is no access cookie, or the cookie is invalid, expired, or revoked, an authentication is triggered. The authentication can include redirecting the client to an identity provider login page, which may have been configured by the customer. If the user successfully authenticates via the identity provider, an access cookie is sent to the client and the client is redirected to resubmit the request with the access cookie. If the user does not successfully authenticate via the identity provider, the request will not be allowed.

If the traffic does not match any ruleset, then the traffic is blocked. If there is only one ruleset that matches the traffic and has an Allow action, the result of this evaluation will be an allow decision. If there is only one ruleset that matches the traffic and has a Block action, the result of this phase will be a block decision and operation 430 is performed where the secure web gateway 130 blocks the traffic. If there is only one ruleset that matches the traffic and has a non-identity action (e.g., a service authentication action), then the traffic will have an allow decision from this evaluation and an authorization token is generated and attached as a cookie header to be provided to the origin application (e.g., the private self-hosted application 168). If there is only one ruleset that matches with a bypass action, then the traffic will have an allow decision from this evaluation.

There can be multiple rulesets from multiple private self-hosted application policies that match the traffic. In an embodiment, a policy precedence system is used such that policies are evaluated in order of precedence, which can be configured by the customer, and a first matching policy that has an Allow or Block action will control and the evaluation stops and no subsequent policies can override the decision at this evaluation. For example, if there are two policies that would both match where the first policy according to precedence has an Allow action and the second policy has a Block action, the action of the first matching policy controls, meaning that the result of this evaluation at operation 435 will be an allow decision. In another embodiment, there is no policy precedence and to allow the traffic, the traffic must not match any Block action. Using the same example of two policies that both match where one policy has an Allow action and another policy has a Block action, in this embodiment, the result of this evaluation will be a block decision and operation 430 is performed where the secure web gateway 130 will block the traffic because there was a policy that matched a Block action.

If the result of this evaluation is an allow decision, then operation 440 is performed. If the result of this evaluation is a block decision, then operation 430 is performed where the secure web gateway 130 blocks the traffic.

At operation 440, the secure web gateway 130 evaluates the HTTP request against the set of L4 policies configured at the secure web gateway 130 (e.g., in operation 412). There can be zero or multiple L4 policies that match the traffic. If there are no L4 gateway policies that match the traffic, the secure web gateway 130 treats the traffic as having an implicit allow decision. In an embodiment, a policy precedence system is used such that multiple policies are evaluated in order of precedence, which can be configured by the customer, and a first matching policy that has an Allow or Block action will control and the evaluation stops for these policies. In another embodiment, there is no policy precedence and to allow the traffic, the traffic must not match any Block action. If there is an allow decision from this evaluation, then operation 445 is performed. If there is a block decision from this evaluation, then operation 430 is performed where the secure web gateway 130 blocks the traffic.

Referring back to operation 420, if the traffic is not HTTPS traffic that can be inspected, then operation 450 is performed. At operation 450, the secure web gateway 130 evaluates the traffic against the set of L4 policies configured at the secure web gateway 130 (e.g., in operation 412). This operation is similar to the operation 440. There can be zero or multiple L4 policies that match the traffic. If there are no L4 gateway policies that match the traffic, the secure web gateway 130 treats the traffic as having an implicit allow decision. In an embodiment, a policy precedence system is used such that multiple policies are evaluated in order of precedence, which can be configured by the customer, and a first matching policy that has an Allow or Block action will control and the evaluation stops for these policies. In another embodiment, there is no policy precedence and to allow the traffic, the traffic must not match any Block action. If there is an allow decision from this evaluation, then operation 455 is performed. If there is a block decision from this evaluation, then operation 430 is performed where the secure web gateway 130 blocks the traffic.

At operation 455, the secure web gateway 130 evaluates the traffic against the set of one or more rules that are generated from the set of one or more access policies for accessing the private self-hosted application 168. In this operation, the secure web gateway 130 cannot or does not inspect the traffic. The secure web gateway 130 loads or accesses configuration for the private self-hosted application 168, which may include one or more configuration fields that are specific to the private self-hosted application 168 (e.g., the hostname, an application identifier, a session duration); one or more configuration fields that are specific to the customer that configured the application (e.g., an account ID, the authentication domain, whether custom block pages are used); account access key(s) (e.g., a key for signing tokens for requests with non-identity, a key for decrypting a VPN session); account service tokens (e.g., all service tokens for the account); and session revocations (e.g., all the revocations for an account). The secure web gateway 130 determines the values for the fields it will match against when evaluating the ruleset, like as previously described. For example, if a policy has an identity-based selector, an identity of the user may need to be determined. In an embodiment, the secure web gateway 130 performs a session validation to verify and authenticate the session of the client to ensure that the session is valid.

Session validation during this operation is different from the session validation during operation 435. Unlike the session validation described in operation 435, which can check for an access cookie in the traffic, cookies are not available in this operation because the secure web gateway is evaluating the traffic only up to layer 4. As part of validating the session, the secure web gateway 130 attempts to read an application session token for the client device. If the application session token is valid, not expired, and not revoked, the session validation is successful. If a valid application session token is not found, the secure web gateway 130 notifies the client device that the user needs to be authenticated. This notification is through a data channel to a software agent that executes on the client device (if such a software agent is not executing, the traffic will be blocked). This notification causes the client device to open a browser window to login with a metadata application session token created by the secure web gateway 130. This application session token is similar to the application session token returned in the session validation during operation 435, but it also includes a device identifier to associate the authenticating client device to the created application session token. The client network application 112 is then redirected to an identity provider login page, which may have been configured by the customer. If the user successfully authenticates via the identity provider, the application session token is written to storage available to the server. The secure web gateway 130 will periodically request the application session token data from the storage until it is available. Until a valid application session token is available, the traffic will not egress from the secure web gateway 130. Once the valid application session token is available, then processing can continue for the allow decision.

If the traffic does not match any ruleset, then operation 430 is performed where the secure web gateway 130 blocks the traffic. If there is only one ruleset that matches the traffic and has an Allow action, then a result of this evaluation is an Allow decision and operation 445 is performed. If there is only one ruleset that matches the traffic and has a Block action, then operation 430 is performed where the secure web gateway 130 blocks the traffic. If there is only one ruleset that matches the traffic and has a non-identity action (e.g., a service authentication action), then operation 430 is performed where the secure web gateway 130 blocks the traffic (an assertion token should not be associated with traffic that cannot be inspected). If there is only one ruleset that matches the traffic and has a bypass action, then operation 445 is performed. Thus, if there is an allow decision, then operation 445 is performed. If there is a block decision, then operation 430 is performed where the secure web gateway 130 blocks the traffic.

There can be multiple rulesets from multiple private self-hosted application policies that match the traffic. In an embodiment, a policy precedence system is used such that policies are evaluated in order of precedence, which can be configured by the customer, and a first matching policy that has an Allow or Block action will control and the evaluation stops and no subsequent policies can override the decision at this evaluation. For example, if there are two policies that would both match where the first policy according to precedence has an Allow action and the second policy has a Block action, the action of the first matching policy controls, meaning that the result of this evaluation at operation 440 will be an allow decision. In another embodiment, there is no policy precedence and to allow the traffic, the traffic must not match any Block action. Using the same example of two policies that both match where one policy has an Allow action and another policy has a Block action, in this embodiment, the result of this evaluation will be a block decision and operation 430 is performed where the secure web gateway 130 will block the traffic because there was a policy that matched a Block action.

At operation 445, the secure web gateway 130 routes the traffic to the private self-hosted application. For example, the secure web gateway 130 causes the traffic to be sent to the customer infrastructure 150 as configured by the customer. As an example, if the private self-hosted application 168 is connected with a tunnel to the distributed cloud computing network 120, the routing phase 255 transmits the traffic towards the tunnel for delivery to the private self-hosted application 168.

Figure 5:
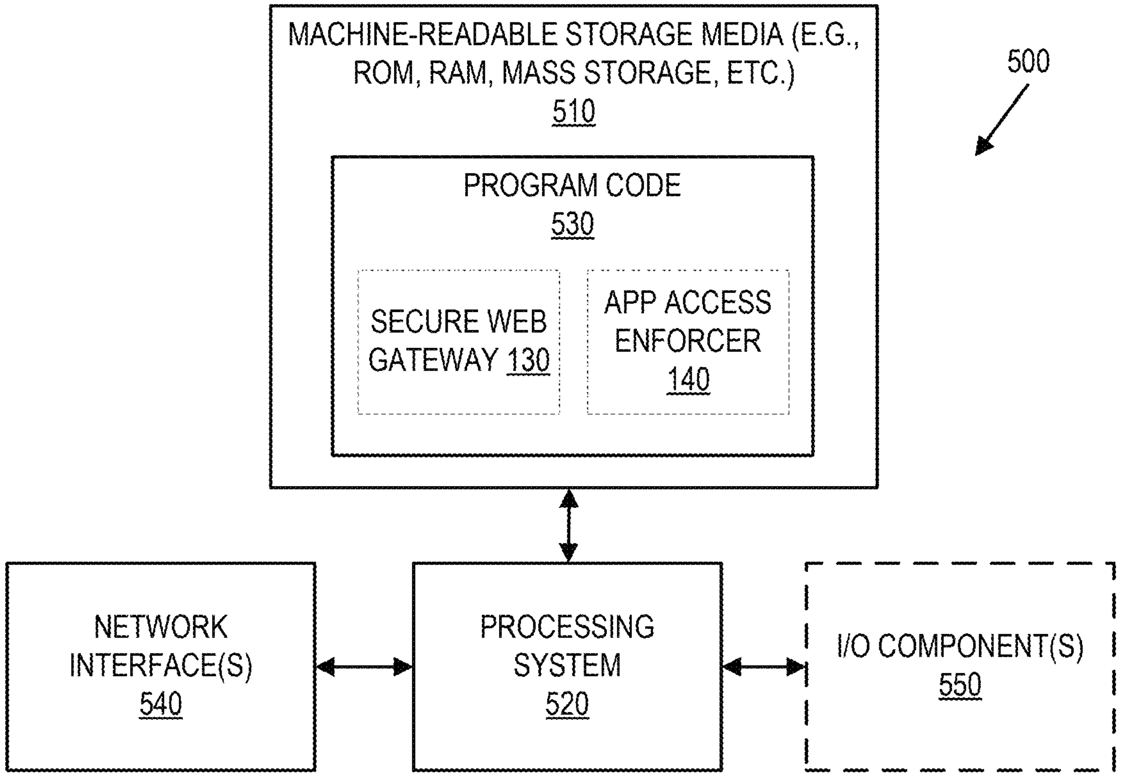
FIG. 5 is a block diagram illustrating a data processing system that can be used in an embodiment.

FIG. 5 illustrates a block diagram for an exemplary data processing system 500 that may be used in some embodiments. One or more such data processing systems 500 may be utilized to implement the embodiments and operations described with respect to the servers that implement the secure web gateway 130 and the application access enforcer 140. Data processing system 500 includes a processing system 520 (e.g., one or more processors and connected system components such as multiple connected chips).

The data processing system 500 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals), which is coupled to the processing system 520. For example, the depicted machine-readable storage media 510 may store program code 530 that, when executed by the processing system 520, causes the data processing system 500 to execute the secure web gateway 130 and/or the application access enforcer 140, and/or any of the operations described herein.

The data processing system 500 also includes one or more network interfaces 540 (e.g., a wired and/or wireless interfaces) that allows the data processing system 500 to transmit data and receive data from other computing devices, typically across one or more networks (e.g., Local Area Networks (LANs), the Internet, etc.). The data processing system 500 may also include one or more input or output ("I/O") components 550. Additional components, not shown, may also be part of the system 500, and, in certain embodiments, fewer components than that shown in One or more buses may be used to interconnect the various components shown in FIG. 5.

The techniques shown in the figures can be implemented using code and data stored and executed on one or more electronic devices (e.g., a client device, a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals-such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding. It will be appreciated, however, by one skilled in the art that embodiments may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a cloud-based security service that includes a secure web gateway and an application access enforcer, the method comprising:

receiving, at the application access enforcer, configuration from a customer of the cloud-based security service for a private self-hosted application, wherein the private self-hosted application is self-hosted at infrastructure of the customer, wherein the private self-hosted application is identified through a private hostname that is not part of a public domain name system (DNS) or through a private IP address that is not a publicly routable IP address;

receiving configuration from the customer for a set of one or more access policies for accessing the private self-hosted application;

generating, from the set of one or more access policies for accessing the private self-hosted application, one or more rules to be evaluated by the secure web gateway;

receiving, at the secure web gateway, configuration from the customer for a set of one or more L7 policies that apply to L7 traffic, wherein at least one of the set of one or more L7 policies is scoped to the private self-hosted application;

receiving first traffic at the secure web gateway from a first client device, the first traffic destined for the private self-hosted application;

determining that the first traffic is first HTTPS traffic that is allowed to be inspected, the first HTTPS traffic including a first HTTP request;

evaluating, at the secure web gateway, the first HTTP request against the set of one or more L7 policies;

determining that the first HTTP request is not to be blocked as a result of the evaluating the first HTTP request against the set of one or more L7 policies;

evaluating, at the secure web gateway, the first HTTP request against the one or more rules that are generated from the set of one or more access policies for accessing the private self-hosted application;

determining that the first HTTP request is not to be blocked as a result of evaluating the first HTTP request against the one or more rules that are generated from the set of one or more access policies for accessing the private self-hosted application; and transmitting the first HTTP request to the private self-hosted application.

2. The method of claim 1, further comprising:

receiving, at the secure web gateway, configuration from the customer for a set of one or more network level policies;

receiving second traffic at the secure web gateway from a second client device, the second traffic destined for the private self-hosted application;

evaluating, at the secure web gateway, the second traffic against the set of one or more network level policies;

determining that the second traffic is to be blocked as a result of evaluating the second traffic against the set of one or more network level policies; and dropping the second traffic.

3. The method of claim 1, further comprising:

receiving second traffic at the secure web gateway from a second client device, the second traffic destined for the private self-hosted application;

determining that the second traffic is traffic that is not allowed to be inspected;

evaluating, at the secure web gateway, the second traffic against the one or more rules that are generated from the set of one or more access policies for accessing the private self-hosted application;

determining that the second traffic is to be blocked as a result of evaluating the second traffic against the one or more rules that are generated from the set of one or more access policies for accessing the private self-hosted application; and dropping the second traffic.

4. The method of claim 3, wherein evaluating the second traffic against the one or more rules that are generated from the set of one or more access policies for accessing the private self-hosted application includes performing a session validation that includes:

causing a client network application of the second client device to redirect to an identity provider login page; and responsive to a successful authentication via an identity provider, writing an application session token for the second client device to storage available to the secure web gateway.

5. The method of claim 3, wherein the second traffic is non-HTTP traffic.

6. The method of claim 1, wherein the set of one or more L7 policies include one or more of: page level filtering; data loss prevention (DLP), and browser isolation control.

7. The method of claim 1, wherein evaluating the first HTTP against the set of one or more L7 policies includes:

determining that a valid access token is not available from the first HTTP request;

causing a client network application of the first client device to redirect to an identity provider login page;

responsive to a successful authentication via an identity provider, generating an access token and setting the access token in a cookie; and sending the cookie to the client network application and redirecting the client to resubmit the first HTTP request with the cookie.

8. A non-transitory machine-readable storage medium that provides instructions that, if executed by a processing system of a cloud-based security service that includes a secure web gateway and an application access enforcer, will cause said processing system to perform operations comprising:

receiving, at the application access enforcer, configuration from a customer of the cloud-based security service for a private self-hosted application, wherein the private self-hosted application is self-hosted at infrastructure of the customer, wherein the private self-hosted application is identified through a private hostname that is not part of a public domain name system (DNS) or through a private IP address that is not a publicly routable IP address;

receiving configuration from the customer for a set of one or more access policies for accessing the private self-hosted application;

generating, from the set of one or more access policies for accessing the private self-hosted application, one or more rules to be evaluated by the secure web gateway;

receiving, at the secure web gateway, configuration from the customer for a set of one or more L7 policies that apply to L7 traffic, wherein at least one of the set of one or more L7 policies is scoped to the private self-hosted application;

receiving first traffic at the secure web gateway from a first client device, the first traffic destined for the private self-hosted application;

determining that the first traffic is first HTTPS traffic that is allowed to be inspected, the first HTTPS traffic including a first HTTP request;

evaluating, at the secure web gateway, the first HTTP request against the set of one or more L7 policies;

determining that the first HTTP request is not to be blocked as a result of the evaluating the first HTTP request against the set of one or more L7 policies;

evaluating, at the secure web gateway, the first HTTP request against the one or more rules that are generated from the set of one or more access policies for accessing the private self-hosted application;

determining that the first HTTP request is not to be blocked as a result of evaluating the first HTTP request against the one or more rules that are generated from the set of one or more access policies for accessing the private self-hosted application; and transmitting the first HTTP request to the private self-hosted application.

9. The non-transitory machine-readable storage medium of claim 8, wherein the operations further comprise:

receiving, at the secure web gateway, configuration from the customer for a set of one or more network level policies;

receiving second traffic at the secure web gateway from a second client device, the second traffic destined for the private self-hosted application;

evaluating, at the secure web gateway, the second traffic against the set of one or more network level policies;

determining that the second traffic is to be blocked as a result of evaluating the second traffic against the set of one or more network level policies; and dropping the second traffic.

10. The non-transitory machine-readable storage medium of claim 8, wherein the operations further comprise:

receiving second traffic at the secure web gateway from a second client device, the second traffic destined for the private self-hosted application;

determining that the second traffic is traffic that is not allowed to be inspected;

evaluating, at the secure web gateway, the second traffic against the one or more rules that are generated from the set of one or more access policies for accessing the private self-hosted application;

determining that the second traffic is to be blocked as a result of evaluating the second traffic against the one or more rules that are generated from the set of one or more access policies for accessing the private self-hosted application; and dropping the second traffic.

11. The non-transitory machine-readable storage medium of claim 10, wherein evaluating the second traffic against the one or more rules that are generated from the set of one or more access policies for accessing the private self-hosted application includes performing a session validation that includes:

causing a client network application of the second client device to redirect to an identity provider login page; and responsive to a successful authentication via an identity provider, writing an application session token for the second client device to storage available to the secure web gateway.

12. The non-transitory machine-readable storage medium of claim 10, wherein the second traffic is non-HTTP traffic.

13. The non-transitory machine-readable storage medium of claim 8, wherein the set of one or more L7 policies include one or more of: page level filtering; data loss prevention (DLP), and browser isolation control.

14. The non-transitory machine-readable storage medium of claim 8, wherein evaluating the first HTTP against the set of one or more L7 policies includes:

determining that a valid access token is not available from the first HTTP request;

causing a client network application of the first client device to redirect to an identity provider login page;

responsive to a successful authentication via an identity provider, generating an access token and setting the access token in a cookie; and sending the cookie to the client network application and redirecting the client to resubmit the first HTTP request with the cookie.

15. A server of a cloud-based security service that includes a secure web gateway and an application access enforcer, the server comprising:

a processing system; and a non-transitory machine-readable storage medium that provides instructions that, if executed by the processing system, will cause the server to perform operations including, receiving, at the application access enforcer, configuration from a customer of the cloud-based security service for a private self-hosted application, wherein the private self-hosted application is self-hosted at infrastructure of the customer, wherein the private self-hosted application is identified through a private hostname that is not part of a public domain name system (DNS) or through a private IP address that is not a publicly routable IP address, receiving configuration from the customer for a set of one or more access policies for accessing the private self-hosted application, generating, from the set of one or more access policies for accessing the private self-hosted application, one or more rules to be evaluated by the secure web gateway, receiving, at the secure web gateway, configuration from the customer for a set of one or more L7 policies that apply to L7 traffic, wherein at least one of the set of one or more L7 policies is scoped to the private self-hosted application, receiving first traffic at the secure web gateway from a first client device, the first traffic destined for the private self-hosted application, determining that the first traffic is first HTTPS traffic that is allowed to be inspected, the first HTTPS traffic including a first HTTP request, evaluating, at the secure web gateway, the first HTTP request against the set of one or more L7 policies, determining that the first HTTP request is not to be blocked as a result of the evaluating the first HTTP request against the set of one or more L7 policies, evaluating, at the secure web gateway, the first HTTP request against the one or more rules that are generated from the set of one or more access policies for accessing the private self-hosted application, determining that the first HTTP request is not to be blocked as a result of evaluating the first HTTP request against the one or more rules that are generated from the set of one or more access policies for accessing the private self-hosted application, and transmitting the first HTTP request to the private self-hosted application.

16. The server of claim 15, wherein the operations further comprise:

receiving, at the secure web gateway, configuration from the customer for a set of one or more network level policies;

receiving second traffic at the secure web gateway from a second client device, the second traffic destined for the private self-hosted application;

evaluating, at the secure web gateway, the second traffic against the set of one or more network level policies;

determining that the second traffic is to be blocked as a result of evaluating the second traffic against the set of one or more network level policies; and dropping the second traffic.

17. The server of claim 15, wherein the operations further comprise:

receiving second traffic at the secure web gateway from a second client device, the second traffic destined for the private self-hosted application;

determining that the second traffic is traffic that is not allowed to be inspected;

evaluating, at the secure web gateway, the second traffic against the one or more rules that are generated from the set of one or more access policies for accessing the private self-hosted application;

determining that the second traffic is to be blocked as a result of evaluating the second traffic against the one or more rules that are generated from the set of one or more access policies for accessing the private self-hosted application; and dropping the second traffic.

18. The server of claim 17, wherein evaluating the second traffic against the one or more rules that are generated from the set of one or more access policies for accessing the private self-hosted application includes performing a session validation that includes:

causing a client network application of the second client device to redirect to an identity provider login page; and responsive to a successful authentication via an identity provider, writing an application session token for the second client device to storage available to the secure web gateway.

19. The server of claim 17, wherein the second traffic is non-HTTP traffic.

20. The server of claim 15, wherein the set of one or more L7 policies include one or more of: page level filtering; data loss prevention (DLP), and browser isolation control.

21. The server of claim 15, wherein evaluating the first HTTP against the set of one or more L7 policies includes:

determining that a valid access token is not available from the first HTTP request;

causing a client network application of the first client device to redirect to an identity provider login page;

responsive to a successful authentication via an identity provider, generating an access token and setting the access token in a cookie; and sending the cookie to the client network application and redirecting the client to resubmit the first HTTP request with the cookie.

* * * * *